United States Patent [19]

Meyer

[11] Patent Number: 4,615,713
[45] Date of Patent: Oct. 7, 1986

[54] ASH TEMPERATURE MEASUREMENT MEANS FOR A FIXED BED GASIFIER

[75] Inventor: Philippus J. Meyer, Secunda, South Africa

[73] Assignee: Sasol Operations (Proprietary) Limited, Johannesburg, South Africa

[21] Appl. No.: 605,897

[22] Filed: May 1, 1984

[30] Foreign Application Priority Data

May 10, 1983 [ZA] South Africa .................... 83/3339

[51] Int. Cl.⁴ ............................................. C10J 3/42
[52] U.S. Cl. ........................................ 48/77; 48/63;
48/68; 48/87; 110/185
[58] Field of Search ................ 48/63, 67, 76, 77, 85.2, 48/87, DIG. 10, 197 R, 210, 68, 73; 432/58; 110/165 R, 185, 266, 247, 171, 259

[56] References Cited

U.S. PATENT DOCUMENTS

| | | | |
|---|---|---|---|
| 2,118,651 | 5/1938 | Macchi | 110/165 R |
| 2,689,786 | 9/1954 | Hubmann | 48/77 |
| 3,847,562 | 11/1974 | Hamilton | 48/76 |
| 3,930,811 | 1/1976 | Hiller et al. | 48/63 |
| 4,014,664 | 3/1977 | Kupfer et al. | 48/63 |
| 4,433,978 | 2/1984 | Schenone et al. | 48/76 |
| 4,453,949 | 6/1984 | Fasching et al. | 48/77 |

FOREIGN PATENT DOCUMENTS

| | | | |
|---|---|---|---|
| 150756 | 9/1981 | Fed. Rep. of Germany | 48/210 |
| 3046249 | 12/1981 | Fed. Rep. of Germany | 48/203 |
| 694350 | 7/1953 | United Kingdom | 110/190 |
| 2032409 | 5/1980 | United Kingdom | 201/25 |

Primary Examiner—Barry S. Richman
Assistant Examiner—Joye L. Woodard
Attorney, Agent, or Firm—Dressler, Goldsmith, Shore, Sutker & Milnamow, Ltd.

[57] ABSTRACT

An apparatus for measuring the ash temperature in a gasifier (10) of the kind described, which includes providing an ash contact member (31) in the ash flow path (20) downstream of the ash outlet (21) of the gasifier, and measuring the temperature of the ash contact member. The invention also provides ash temperature measurement means (30) for the gasifier (10). The ash temperature measurement means includes the ash contact member which is located in the ash flowpath below the ash outlet and which is capable of assuming a temperature proportional to the temperature of ash discharged from the gasification chamber (12) and which comes into contact with the contact member, as well as temperature sensing means adapted to measure the temperature of the ash contact member.

4 Claims, 3 Drawing Figures

ASH TEMPERATURE MEASUREMENT MEANS FOR A FIXED BED GASIFIER

FIELD OF THE INVENTION

This invention relates to the gasification of coal. It relates in particular to a method of measuring the ash temperature of a coal gasifier, to ash temperature measurement means for a coal gasifier, to a coal gasifier, to a method of operating a coal gasifier, and to a method of converting a coal gasifier.

DESCRIPTION OF THE PRIOR ART

Applicant is aware of a fixed bed dry bottom coal gasifier having a gasification chamber for gasifying coal in a coal bed to produce synthesis gas, and ash in an ash bed below the coal bed. The gasifier has a gas outlet and an ash discharge outlet leading from the gasification chamber, as well as discharge means for discharging ash from the chamber. Such a gasifier is hereinafter referred to as 'a gasifier of the kind described'.

The Applicant has found that, in the operation of a gasifier of the kind described, it is important to be able to control the level at which the interface ('fire bed') between the coal bed and the ash bed is located above the discharge means, i.e. the thickness of the ash bed above the discharge means, accurately to ensure an acceptable synthesis gas temperature and quality at the gas outlet. If the fire bed is allowed to rise to a too high level above the discharge means, off-specification synthesis gas can be obtained and an undesirably high gas outlet temperature can result. If the fire bed is allowed to drop to a too low level above the discharge means, the ash temperature will rise to an unacceptably high level and can result in equipment damage.

The fire bed level, i.e. the ash bed thickness, is usually controlled by measuring the ash temperature, i.e. the thicker the ash bed, the lower the temperature of the ash discharged. The bed thickness can then be controlled manually, by changing grate speed, in response to the ash temperature measured, the thickness being related to ash temperature through experience and skill of the operator.

The ash bed thickness is usually, in addition, also controlled by monitoring the gas outlet temperature. Too high a gas outlet temperature means that the fire bed has been allowed to move too high up the gasification chamber. Due to the lack of sensitivity of the influence of the ash bed thickness on the outlet gas temperature (i.e. the thickness can vary widely without influencing the gas outlet temperature significantly), the gasifier cannot usually be operated by merely monitoring outlet gas temperature.

The Applicant has found that the ash temperature cannot be measured in the gasification chamber itself, due to too high temperatures in the chamber, variation in ash bed thickness, movement of the ash bed, etc. Consequently, the ash temperature is usually measured in an ash lock located downstream of the ash discharge outlet. However, the temperature of the ash in the ash lock fluctuates with the level of the ash in the ash lock. In addition, to overcome problems of wear of the temperature-sensing device used, the device is usually located at the top of the ash lock where it does not come into direct contact with the ash. Thus, the temperature measured by the sensing device is only a radiation temperature and not a direct ash temperature.

As a result of said fluctuating temperatures, the Applicant has found that the ash bed thickness must be controlled manually. This, Applicant has found, depends on operator skill and judgment, and often results in undesirable fluctuation in ash bed thickness and consequent unsteady operation of the gasifier.

OBJECTS OF THE PRESENT INVENTION

It is an object of this invention to provide a method of measuring the ash temperature of a gasifier of the kind described, which is more accurate and more reliable than the abovementioned method. It is a further object of the invention to provide a method of operating such a gasifier, which includes better control of the ash bed thickness in the gasification chamber than is possible with the method known to the Applicant.

SUMMARY OF THE INVENTION

According to one aspect of the invention, there is provided a method of measuring the ash temperature of a gasifier of the kind described, the method including providing an ash contact member in the ash flowpath downstream of the ash outlet of the gasifier; and measuring the temperature of the ash contact member.

According to another aspect of the invention, there is provided ash temperature measurement means for a gasifier of the kind described, the ash temperature measurement means including an ash contact member locatable in the ash flowpath below the ash outlet and capable, in use, of assuming a temperature proportional to the temperature of ash discharged from the gasification chamber and which comes into contact with the contact member;

temperature sensing means adapted to measure the temperature of the ash contact member.

The gasifier may be a LURGI gasifier in which the ash discharge means is in the form of a circular (when seen in plan view) grate mounted to rotate above the ash outlet and in which the outlet is an annular outlet.

The ash contact member may comprise a wear plate attachable to the wall of a water jacket of the gasification chamber at a position below the discharge means of the gasifier.

A plurality of said wear plates may be provided, the wear plates being arranged or arrangeable in an annular fashion and locatable so that they define a central ash discharge pathway to an ash lock of the gasifier. The wear plates may be locatable substantially the same distance from the ash outlet.

The temperature-sensing means may include a thermocouple. The thermocouple may be attachable to an undersurface of the wear plate so that the thermocouple, in use, does not come into contact with the ash.

According to yet another aspect of the invention, there is provided a gasifier of the kind described, which includes ash temperature measurement means as hereinbefore described, located in the ash flowpath below the ash discharge outlet of the gasifier.

According to yet another aspect of the invention, there is provided a method of operating a gasifier of the kind described, which includes measuring the ash temperature of ash discharged by the gasifier by means of ash temperature measurement means as hereinbefore described, and which is located in the ash flowpath below the ash outlet; and controlling the ash bed thickness in response to the measured ash temperature.

The method may include automatically controlling the ash bed thickness by means of instrumentation.

The method may further include measuring the temperature of a steam/oxygen mixture injected into the coal bed of the gasifier and controlling the ash bed thickness automatically by means of instrumentation in response to the steam/oxygen mixture temperature measured and the ash temperature measured by said ash temperature measurement means.

The method may still further include measuring the ash temperature in an ash lock located below said ash temperature measurement means and controlling the ash bed thickness automatically by means of instrumentation in response to the ash temperature measured in the ash lock, the steam/oxygen mixture temperature measured and the ash temperature measured by said ash temperature measurement means.

The method may also include measuring the gas outlet temperature and controlling the ash bed thickness automatically by means of instrumentation in response to the gas outlet temperature measured, the ash temperature measured in the ash lock, the steam/oxygen mixture temperature measured and the ash temperature measured by said ash temperature measurement means.

The method may include locking up a control system for automatically controlling the ash bed thickness during a de-ashing cycle of the ash lock.

The ash discharge means may be in the form of a grate mounted to rotate above the ash outlet, the controlling of the bed height comprising controlling the speed of rotation of the grate.

The method may include measuring the ash temperature by means of a number of temperature sensing means located at substantially the same level, averaging the temperatures measured and controlling the bed height in response to said averaged temperature.

According to still another aspect of the invention, there is provided a method of operating a gasifier of the kind described, which includes measuring the ash temperature with ash temperature measurement means located below the ash outlet; and automatically controlling the ash bed thickness by means of instrumentation in response to the measured ash temperature.

According to yet another aspect of the invention, there is provided a method of converting a fixed bed dry bottoms coal gasifier of the kind described, which includes providing ash temperature measurement means as hereinbefore described in the ash flowpath downstream of the ash discharge opening.

BRIEF DESCRIPTION OF THE DRAWINGS

The invention will now be described by way of example with reference to the accompanying diagrammatic drawings.

DESCRIPTION OF THE PREFERRED EMBODIMENT

Figures 1, 2:
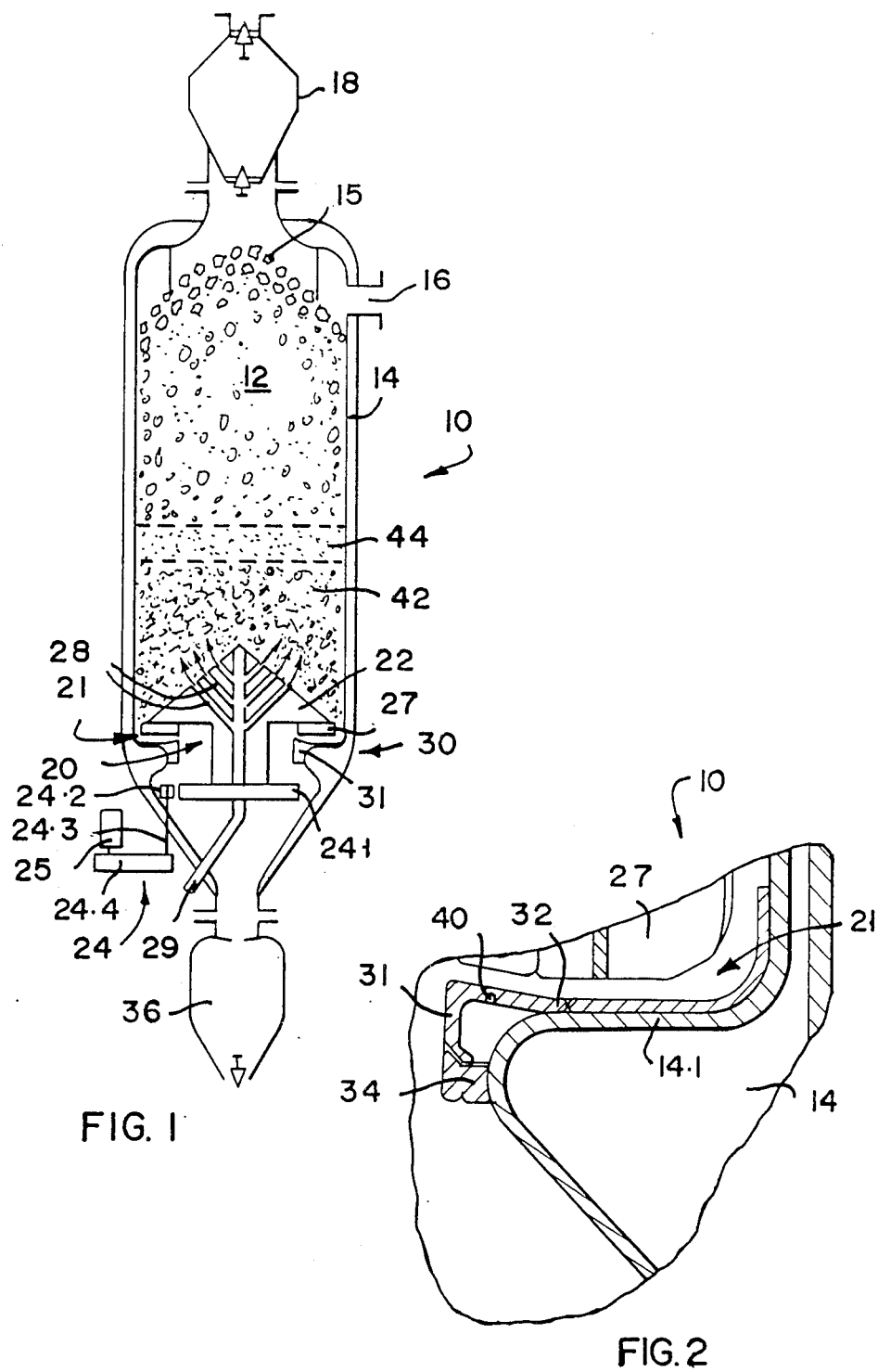
FIG. 1 shows a longitudinal sectional view of a gasifier of the kind described, according to the invention.
FIG. 2 shows an enlarged sectional view of part of the gasifier shown in FIG. 1.

Referring to FIGS. 1 and 2, reference numeral 10 generally indicates a LURGI gasifier of the kind described.

The gasifier 10 includes ash temperature measurement means, generally indicated by reference numeral 30.

The gasifier 10 comprises a cylindrical gasification chamber 12 surrounded by a water jacket 14. The chamber 12 is provided with an elevated gas outlet 16 as well as an elevated coal lock 18 for feeding coal into the chamber 12 so that the coal forms a coal bed 15 in the chamber.

Figure 3:
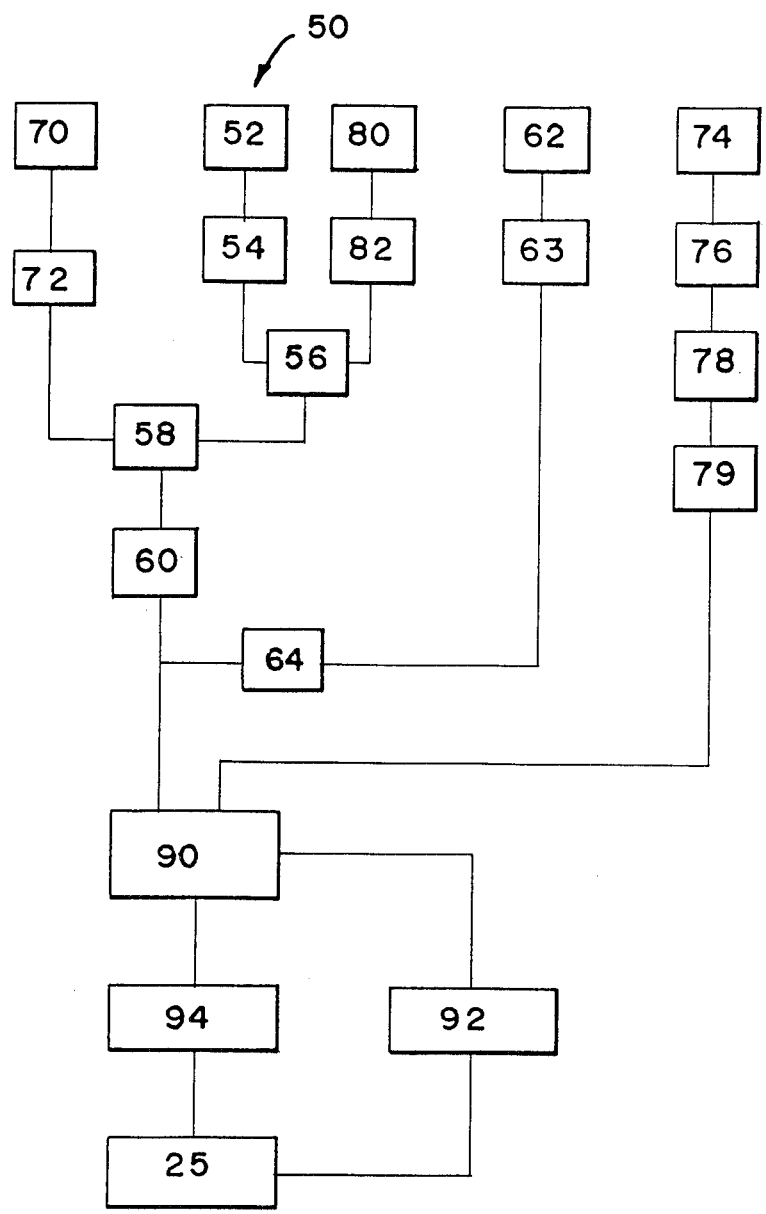
FIG. 3 shows, in block diagram form, a control circuit for the gasifier shown in FIG. 1.

The gas outlet temperature is measured by means of a thermocouple (not shown) in the gas outlet 16 (indicated by reference numeral 62 in FIG. 3).

At the bottom of the chamber 12 there is provided a rotatable grate 22. The grate 22 is driven to rotate by a drive mechanism, generally indicated by reference numeral 24. The drive mechanism 24 includes, inter alia, a circular gear 24.1 attached to the bottom of the grate 22, a further gear 24.2, attached to a shaft 24.3, which intermeshes with the gear 24.1 thereby to drive the grate 22 to rotate as the shaft 24.3 rotates. The shaft 24.3 is the output shaft of a gearbox 24.4 which is operatively connected to an electric motor 25. The drive mechanism 24 is controlled by a grate speed controller (indicated as 90 in FIG. 3) for controlling the speed of the motor 25, thereby to control the rotational speed of the grate 22.

The grate 22 is conically shaped with internal passageways 28, having outlets in the outer surface of the grate, through which, in use, a mixture of oxygen and steam passes into the chamber. A supply conduit 29, which passes through the water jacket 14, feeds an oxygen/steam mixture to the passageways 28.

The temperature of the steam/oxygen mixture is measured (not shown) in the supply conduit 29 (indicated by reference numeral 80 in FIG. 3).

The grate is provided with a plurality of blades 27 spaced apart about its periphery, for discharging ash from the chamber into a flowpath 20 via an annular ash discharge outlet 21.

The ash temperature measurement means 30 includes a plurality of wear plates 31 provided in the ash flowpath 20. The wear plates also serve to prevent the ash, which flows along the flowpath, from impinging directly on water jacket 14, as the ash is discharged from the chamber 12.

Each wear plate 31 is attached to the wall 14.1 of the water jacket, as indicated by reference numerals 32 and 34 respectively, so that they will, in use, assume the temperature of the ash which impinges on them rather than the temperature of the water jacket 14. The wear plates 31 are arranged in an annular fashion so that they define said ash flowpath 20. The wear plates 31 are all located substantially the same distance from the outlet 21.

A thermocouple (not shown—indicated by 52 in FIG. 3) is attached to at least some of the wear plates 31 at the position indicated by reference numeral 40. The thermocouples are located so that they do not come into contact with the ash as it is discharged from the chamber, and are thus not subject to damage by the flow of ash. The thermocouples are electrically connected to an automatic control system 50 (see FIG. 3) for the gasifier.

Downstream of the discharge outlet 21 there is provided an ash lock 36 into which the ash is discharged. The temperature of the ash in the ash lock is measured by means of a thermocouple (not shown) in the ash lock 36 (indicated by reference numeral 70 in FIG. 3).

Referring to FIG. 3, reference numeral 50 generally indicates a control circuit for the gasifier 10 (see FIGS. 1 and 2).

The control circuit 50 includes thermocouples 52 for measuring the ash temperature, a transmitter 54 electrically connected to the thermocouples 52 and adapted to amplify the signal corresponding to the average temperature measured by the thermocouples (measured in millivolts) and to transmit a corresponding signal to a summer 56.

The circuit also includes a thermocouple 80 in the steam/oxygen supply conduit which measures the steam/oxygen mixture temperature, a transmitter 82 electrically connected to the thermocouple 80 and adapted to amplify the signal corresponding to the temperature measured by the thermocouple (measured in millivolts) and to transmit a corresponding signal to the summer 56.

A bias can be entered manually into the summer 56 and the output of the summer 56 is transmitted to a summer 58.

The circuit also includes a thermocouple 70 for measuring the temperature of the ash in the ash lock, a transmitter 72 electrically connected to the thermocouple 70 and adapted to amplify the signal corresponding to the temperature measured by the thermocouple (measured in millivolts) and to transmit a corresponding signal to the summer 58.

A bias can be entered manually into the summer 58. The output of the summer 58 is transmitted via a diode 60 to a grate speed controller 90.

The circuit also includes a thermocouple 62 for measuring the gas outlet temperature, and which is electrically connected to a temperature-activated trip switch 63. An adjustable milli-amp signal is transmitted from the thermocouple 62 via the trip switch 63 and a diode 64 to the grate speed controller 90.

The circuit also includes an ash lock top cone position indicator 74 which transmits a signal via a special relay 76 and a normal relay 78, to a remote manual station 79. By means of this the grate speed controller 90 can be locked up during a de-ashing cycle of the ash lock, i.e. when no ash is discharged from the gasification chamber while ash is being dumped from the ash lock.

A control loop, consisting of the grate speed controller 90, a motor speed pick-up 92, an instrument/electrical interface 94, and the motor 25, controls the grate speed in response to the final processed signal received from the thermocouples 70, 52, 80 and 62.

With reference to FIGS. 1, 2 and 3, in use, coal is fed into the chamber 12 at regular intervals via the coal lock 18, so as to form a coal bed 15. A mixture of steam and oxygen is fed into the chamber 12 via the inlet pipe 29 and the passageways 28 in the grate 22. In the chamber 12, the steam, oxygen and coal react to form synthesis gas, as well as ash which is located in an ash bed 42. The synthesis gas leaves the chamber via the gas outlet 16. A fire bed 44 separates the ash bed 42 from the coal bed 15, i.e. the fire bed 44 forms an interface between the ash bed 42 and the coal bed 15.

Preferably, the fire bed 44 is located a fixed distance above the top of the grate 22 thereby to provide an acceptable gas outlet temperature, a good quality synthesis gas, and an acceptable ash outlet temperature. Typically, the fire bed 44 may be located about 1 meter above the top of the grate 22.

The level of the fire bed 44, and hence the thickness of the ash bed 42, is controlled automatically by monitoring the temperature of the wear plates 31, the steam/oxygen temperature, the temperature of the ash in the ash lock, and the gas outlet temperature, as described above with reference to FIG. 3. The wear plates 31 assume a temperature directly proportional to the temperature of the discharged ash.

The gas outlet temperature should preferably not exceed 550° C. Typically, the control gas outlet temperature at the station 62 (see FIG. 3) will be set at about 550° C. When the measured temperature at the gas outlet rises above this temperature (thus indicating that the fire bed 44 has moved up the chamber 12), a signal is given to the grate speed controller 90 to increase the grate speed, thereby to discharge more ash from the chamber 12.

The Applicant believes that the fire bed 44 will be located at its desired level when the difference between the steam/oxygen mixture temperature and the ash outlet temperature is controlled in the range of 5° C. to 30° C.

When the difference between these two temperatures is too small, this indicates that the fire bed 44 has moved up the chamber 12. The summer 56 will then provide a signal to controller 90, via summer 58, to speed up the grate. In a similar fashion, when the difference between these two temperatures is too large, the controller 90 will generate a signal to slow down the speed of the grate 22.

The Applicant believes that by providing the ash temperature-measurement means, the ash temperature can be measured more accurately and more reliably than has hitherto been the case. In addition, the Applicant believes that the level of the fire bed 44 can be fairly accurately controlled automatically by means of instrumentation by monitoring the ash outlet temperature, as described above, optionally together with monitoring the steam/oxygen mixture temperature, the ash temperature in the ash lock, and the gas outlet temperature, as described above.

The Applicant further believes that by controlling the level of the fire bed 44 automatically, a considerable increase in gas production can be obtained. Furthermore, gasifier on-stream time is expected to be better than has hitherto been the case, due to longer service life of critical components.

Depending on the gas load, the de-ashing cycle can vary between about half an hour and one hour. Because of the peculiar temperature profile, manual adjustments to the grate speed can at best only be made once per cycle, based on the maximum temperature during the de-ashing cycle. Normally, a few de-ashing cycles are required before a trend can be seen with the result that manual grate speed adjustments are only done at relatively long intervals.

With the automatic control circuit 50, the grate speed can be adjusted continuously during the ash lock filling periods.

It is to be understood that the ash temperature measurement means 30 and the control circuit 50 can be used also during starting up of the gasifier 10, i.e. the level of the fire bed 44 can be controlled automatically with the ash temperature measurement means 30 and the control circuit 50 which can provide the required gradual temperature increase during start up. Operation of a gasifier in accordance with the invention is consequently, in this specification, to be construed so as to include start up operation of such gasifier.

It is also to be understood that, instead of using the control circuit 50, any other equivalent control circuit can be used provided that a gasifier in accordance with the invention can be operated therewith in an analogous manner to that herein before described.

I claim:

1. A fixed bed dry bottom coal gasifier, which includes
    a cylindrical wall defining a fixed coal bed gasification chamber for gasifying coal to produce synthesis gas;
    a gas outlet in the chamber wall near the top of the gasification chamber;
    an annular ash discharge outlet at the bottom of the gasification chamber;
    an ash lock downstream of the ash outlet;
    an inner cylindrical water jacket extending between the ash discharge outlet and the ash lock, and providing a central ash flow path between the ash discharge outlet and the ash lock;
    rotatable discharge means at the bottom of the chamber for discharging ash from the chamber, the ash outlet being provided between the outer periphery of the discharge means and the chamber wall;
    a steam/oxygen mixture supply conduit having at least one discharge opening in the rotatable discharge means;
    an annular ash contact device below the ash outlet and protruding radially inwardly from the water jacket around the upper end of the ash flow path, the ash contact device having a flat upper portion extending substantially horizontally on which ash passing through the ash outlet can rest, the ash contact device being capable of assuming a temperature proportional to the temperature of ash resting on its upper portion; and
    a plurality of temperature sensing means for sensing the temperature of the ash contact device attached to the underside of the upper portion in direct contact with the ash contact device so that ash passing over the ash contact device will not impinge directly on the temperature sensing means.

2. A gasifier according to claim 1, wherein the ash contact device comprises a plurality of wear plates arranged side-by-side in the form of an annulus, and wherein the temperature sensing means comprise thermocouples attached to some of the wear plates.

3. A gasifier according to claim 2, wherein each wear plate includes a vertical portion depending downwardly from the upper portion so that an enclosed annular cavity is provided between the horizontal and vertical portions of the wear plates and the water jacket, with the thermocouples being located in this cavity.

4. Ash temperature measurement means for a fixed bed dry bottom coal gasifier comprising
    a cylindrical wall defining a fixed coal bed gasification chamber for gasifying coal to produce synthesis gas;
    a gas outlet in the chamber wall near the top of the gasification chamber;
    an annular ash discharge outlet at the bottom of the gasification chamber;
    an ash lock downstream of the ash outlet;
    an inner cylindrical water jacket extending between the ash discharge outlet and the ash lock, and providing a central ash flow path between the ash discharge outlet and the ash lock;
    rotatable discharge means at the bottom of the chamber for discharging ash from the chamber, the ash outlet being provided between the outer periphery of the discharge means and the chamber wall;
    a steam/oxygen mixture supply conduit having at least one discharge opening in the rotatable discharge means; the ash temperature measurement means including
    a plurality of wear plates arranged side-by-side in the form of an annulus and having attachment means for attaching them to the water jacket below the ash outlet so that they protrude radially inwardly from the water jacket around the upper end of the ash flow path, each wear plate having a horizontally extending flat portion on which ash can rest, said wear plates being capable of assuming a temperature proportional to the temperature of the ash resting on the flat portion; and
    temperature sensing means attached to the undersurfaces of the flat portions of at least some of the wear plates in direct contact therewith for sensing the temperature of the wear plates.

* * * * *